US008527532B2

(12) United States Patent
Serban et al.

(10) Patent No.: US 8,527,532 B2
(45) Date of Patent: Sep. 3, 2013

(54) TRANSFORMING FUNCTION CALLS FOR INTERACTION WITH HIERARCHICAL DATA STRUCTURES

(75) Inventors: Alexandru Bogdan Serban, Bucharest (RO); Andrei Fierbinteanu, Bucharest (RO)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 13/362,108

(22) Filed: Jan. 31, 2012

(65) Prior Publication Data

US 2013/0198237 A1    Aug. 1, 2013

(51) Int. Cl.
*G06F 17/30*        (2006.01)

(52) U.S. Cl.
USPC .......................................................... 707/759

(58) Field of Classification Search
USPC ........................ 707/4, 7, 102, 759; 709/223
See application file for complete search history.

(56) References Cited

U.S. PATENT DOCUMENTS

| 2008/0288529 A1* | 11/2008 | Cheng et al. | 707/102 |
| 2009/0119296 A1* | 5/2009 | Neogi et al. | 707/7 |
| 2010/0036826 A1* | 2/2010 | Khorlin et al. | 707/4 |

* cited by examiner

*Primary Examiner* — Etienne LeRoux
(74) *Attorney, Agent, or Firm* — Kilpatrick Townsend & Stockton LLP

(57) ABSTRACT

Exemplary embodiments involve a processor receiving a function call formatted to interact with a relational database. The function call references an object in the relational database by referencing at least one table of the relational database and at least one column of the at least one table. The processor transforms the function call into a transformed function call formatted for interacting with a hierarchical data structure. The hierarchical data structure comprises a plurality of nodes, wherein each node has a single parent node. The processor applies the transformed function call to one or more nodes of the hierarchical data structure.

20 Claims, 5 Drawing Sheets

TRANSFORMING FUNCTION CALLS FOR INTERACTION WITH HIERARCHICAL DATA STRUCTURES

TECHNICAL FIELD

This disclosure relates generally to computer software and more particularly relates to transforming function calls for interaction with hierarchical data structures.

BACKGROUND

Programming languages frequently operate on software models having one or more attributes known as objects. A programming language can interact with an object using different persistence frameworks. A persistence framework can include data structures used to store values for the various attributes of an object and one or more processes for interacting with the stored object. Persistence frameworks can include, for example, relational databases and hierarchical storage systems. A relational database can store an object as a row of a table having a predefined number of columns, with each attribute of the object mapped to a column of the table. A hierarchical storage system can store an object as a node in a tree data structure resembling a file system, with each attribute of the object being mapped to a property of the node.

A hierarchical storage system can provide advantages over a relational database, such as increased flexibility and clarity for data handling in content management applications. For example, a hierarchical storage system can be used to store unstructured content that does not necessarily fit in a predefined schema, as opposed to a relational database that requires an object to conform to a data schema (i.e., the columns of a table). Thus, a hierarchical storage system can be better suited than a relational database for storing unstructured or semi-structured data such as web content.

However, developers of applications may be unfamiliar with the standards for hierarchical storage system and therefore may opt to develop applications for relational database systems rather than hierarchical storage system. For example, relational database systems can provide simple methods of handling the business logic of an application. Accordingly, the simplicity of developing applications configured to interact with relational database systems may dissuade developers from leveraging the advantages of hierarchical storage systems.

SUMMARY

Systems and methods are disclosed for transforming function calls formatted for interacting with a relational database to a function call formatted for a hierarchical data structure. An exemplary embodiment involves a processor receiving a function call formatted to operate on a relational database. The function call references an object in the relational database by referencing at least one table of the relational database and at least one column of the at least one table. The processor transforms the function call into a transformed function call formatted for interacting with a hierarchical data structure. The hierarchical data structure comprises a plurality of nodes, wherein each node has a single parent node. The processor applies the transformed function call to one or more nodes of the hierarchical data structure.

These illustrative features are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTION OF THE FIGURES

These and other features, aspects, and advantages of the present disclosure are better understood when the following Detailed Description is read with reference to the accompanying drawings, where.

DETAILED DESCRIPTION

Figure 1:
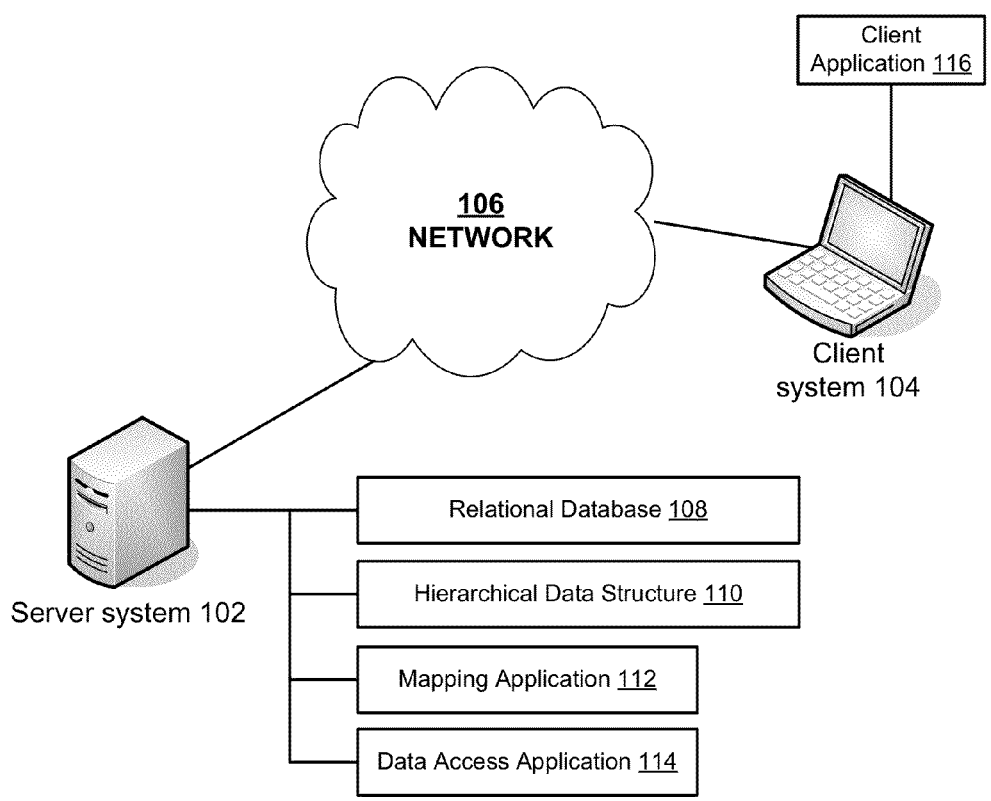
FIG. 1 is a network diagram illustrating a client system accessing data stored at a server system in a hierarchical data structure and a relational database.

Systems and methods are provided for transforming function calls for interaction with hierarchical data structures. The systems and methods can include a mapping application providing a bridge between applications designed for interaction with relational databases and storage systems using hierarchical data structures. The mapping application can transform a function call formatted to interact with a relational database into function call formatted to interact with a hierarchical data structure. The mapping application can thus allow a developer unfamiliar with hierarchical data storage systems to use the same application programming interface ("API") for accessing data stored using either a relational database or hierarchical data structure.

The following example illustrates how a mapping application can transform a function call formatted for interaction with relational databases into a function call formatted for interaction with hierarchical data structures. A relational database may include a table "Cars" for storing car objects, a table "Boats" for storing boat objects, and a table "Vehicles" for storing vehicle objects. Alternatively, objects corresponding to cars, boats and other vehicles may be stored using a hierarchical data structure. The hierarchical data structure can include a hierarchy of nodes, with each node corresponding to an object. For example, nodes corresponding to car objects can be stored as child nodes of a parent node "Cars" and nodes corresponding to boat objects can be stored as child nodes of a parent node "Boat." Both "Cars" and "Boats" can in turn be stored as child nodes of a parent node "Vehicles."

A query for car objects can formatted differently for each a relational database as compared to a hierarchical data structure. For example, although the table "Vehicles" can be related to each of the tables "Cars" and "Boats," a query to the relational database may reference the table "Cars" without referencing the table "Vehicles." By contrast, a query to the hierarchical data structure may reference the table "Cars" by identifying the path from the parent node "Vehicles" (i.e. "/Vehicles/Cars." Accordingly, a query formatted for interaction with the relational database by referencing "Cars" without identifying the path "/Vehicles/Cars" would fail to return any car objects.

To prevent this erroneous result, a mapping application can, for example, transform the query such that any reference to "Cars" is transformed into a reference to "/Vehicles/Cars." Accordingly, an application developed for interaction with a relational database can use the mapping application as a bridge to a hierarchical data structure.

In an exemplary embodiment, a mapping application executed by a processor of a server system can receive a function call formatted to operate on a relational database. The function call can reference an object in the relational database by referencing at least one table of the relational database and at least one column of the table. The mapping application can transform the function call into a transformed function call formatted for interacting with a hierarchical data structure. The hierarchical data structure can include a plurality of nodes having parent-child relationships, wherein each child node has a single parent node. The transformed function call can reference the object in the hierarchical data structure by referencing a relationship between a node storing the object and at least one additional node that is a parent of the node storing the object. The mapping application can apply the transformed function call to one or more nodes of the hierarchical data structure.

As used herein, the term "object" is used to refer to any logical entity that can be manipulated by commands of a programming language. Examples of an object can include (but are not limited to) a variable, a function, a data structure, a combination of variables, functions, and data structures, etc. The object can include an identifier distinguishing the object from other objects. The object can include data stored in the object. The object can include methods by which the object can be used by an application.

As used herein, the term "function call" is used to refer to a reference by an application of a computing system to a subroutine, procedure, or other function that specifies an operation to be performed on an object of a storage model. Examples of a function call can include (but are not limited to) a command to retrieve one or more objects from a storage model, a command to add one or more objects to a storage model, or a command to delete one or more objects from a storage model. A function call can execute a subroutine, procedure, or other function in response to input received via an input device in communication with a computing system or in response to a command generated from the operation of an application executed at a computing system. For example, a first software module can configure a processor of a computing system to execute a function from a second software module by providing a function call to the second software module.

As used herein, the term "storage model" is used to refer to a model for organizing data stored as objects. Examples of a storage model can include (but are not limited to) a relational database or a hierarchical data structure. A storage model can include data schema for organizing objects and the attributes of objects.

As used herein, the term "relational database" is used to refer to a storage model where the data schema includes storing objects in one or more related tables. Each table can include one or more rows. A row can be a record storing the data of an object. Each row in a relational database can correspond to an object. Each row can have one or more columns corresponding to an attribute of the data record. An object can be stored in a relational database by creating a row corresponding to the object and storing each attribute of the object in a column of the row. Because each row in a table has the same columns as every other row in the table, a table can store multiple objects having identical attributes. Each object in a relational database can be accessed by identifying a table in which the object is stored and identifying at least one column having a value identifying the object. Two or more tables in a relational database can be related via a key. A key can be a column in a first table that includes values that correspond to values in a column of a second table.

As used herein, the term "hierarchal data structure" is used to refer to a storage model where the data schema includes storing objects as nodes organized according to a hierarchy. A node can be a container for the data of an object in a hierarchical data structure. Each node can store attributes of an object as properties of the node. Properties have values, which represent the actual data stored in the hierarchical data structure. Nodes can be organized in a according to a hierarchy based on one or more parent/child relationships between nodes. Each parent node can have one more child nodes. Each child node can have a single parent node. Each node in a hierarchal data structure can have attributes that are different from other nodes of the tree structure. Each node can include a relationship to another node and properties of the node. Nodes of a hierarchical data structure can be accessed through paths. A path can be a description of a relationship between nodes, such as "Root/Parent/Child." Such paths can include absolute paths starting from a root node or relative paths to other nodes.

In an exemplary embodiment, transforming the function call can include mapping a reference included in the function call from a table to a path. The path can identify a relationship between a node corresponding to the table and a parent node of the node corresponding to the table. For example, a query referencing the table "Cars" can be transformed to reference the path from a parent node "Vehicles" to a child node "Cars" corresponding to the table "Cars" (i.e., "/Vehicles/Cars").

In additional or alternative embodiments, transforming the function can include mapping a reference included in the function call from a row of the table of the relational database to a child node of the node corresponding to the table. For example, the mapping application can transform a function call adding a row "Car1" to the table "Cars" in a relational database into a function call adding a node "Car1" as a child of the node "Cars" in a hierarchical data structure. Transforming the function can also include mapping a reference from a column of the table of the relational database to a property of the child node. For example, the mapping application can transform a function call modifying the value of a column labeled "Manufacturer" for a row "Car1" in a table "Cars" into a function call modifying a property labeled "Manufacturer" of the node "Car1."

In additional or alternative embodiments, transforming the function can include mapping a reference in the function call to a relationship between a first table of the relational database and a second table to of the relational database a relationship between a first node corresponding to the first table and a second node corresponding to the second table. For example, a table "Vehicles" can be related to each of the tables "Cars" and "Boats." A function call may include a reference to the relationship between "Vehicles" and "Cars" and/or the relationship between "Vehicles" and "Cars." The mapping application can determine that table "Vehicles" has a one-to-many relationship with the tables "Cars" and "Boats." The mapping application can thus determine that a node corresponding to the table "Vehicles" is a parent node of the nodes corresponding to the tables "Cars" and "Boats."

In additional or alternative embodiments, the mapping application can generate a result based on applying the transformed function call to the one or more nodes of the hierarchical data structure. The mapping application can transform the result such that the result is formatted for the relational database. For example, a query to the hierarchical data structure can return one or more objects corresponding to the query. The result may reference the objects in the hierarchical data structure using the path from a parent node to the nodes corresponding to the objects. The mapping application can transform references to the path into references to the table in which the object would be stored in a corresponding relational database. The transformed result can be provided to the application originating the function call.

These illustrative examples are given to introduce the reader to the general subject matter discussed here and are not intended to limit the scope of the disclosed concepts. The following sections describe various additional embodiments and examples with reference to the drawings in which like numerals indicate like elements.

The features discussed herein are not limited to any particular hardware architecture or configuration. A computing device can include any suitable arrangement of components that provide a result conditioned on one or more function calls. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Referring now to the drawings, FIG. 1 is a network diagram illustrating a client system 104 accessing data stored at a server system 102 in a relational database 108 and a hierarchical data structure 110.

The server system 102 can include, but is not limited to, a single server system, a cloud computing system, a grid computing system, etc. The client system 104 can be a computing system such as, but not limited to, a laptop computer, a desktop computer, a tablet computer, or another computing system. The client system 104 can communicate with the server system 102 via the network 106. Examples of the network 106 can include, but are not limited to, a local area network, a wide area network, a wireless network, etc.

The client system 104 can execute a client application 116. The client application 116 can include any application having a module, such as (but not limited to) an API, for accessing or otherwise using data stored remotely at the server system 102. Data can be stored at the server system 102 in a relational database 108, such as (but not limited to) one or more relational databases, or in a hierarchical data structure 110.

The client application 116 can access or otherwise use data stored on the server system 102 by the client system 104 providing function calls from the client application 116 to the server system 102 via the network 106. The function call receive by the server system 102 can cause a data access application 114 to execute an operation specified by the function call. The operation specified by the function call can include accessing or otherwise using the data stored in either the relational database 108 or the hierarchical data structure 110.

A function call from a client application 116 can be formatted for interaction with the relational database 108 but addressed to the hierarchical data structure 110. The server system 102 can execute a mapping application 112 to transform function call formatted for interaction with the relational database 108 into function call formatted for interaction with the hierarchical data structure 110.

Although the mapping application 112 is depicted in FIG. 1 as a separate application executed at the server system 102, other configurations are possible. For example, in embodiments, the mapping application 112 can be executed at the client system 104 as a plug-in to client application 116 or a standalone application operating on the client system 104.

Figure 2:
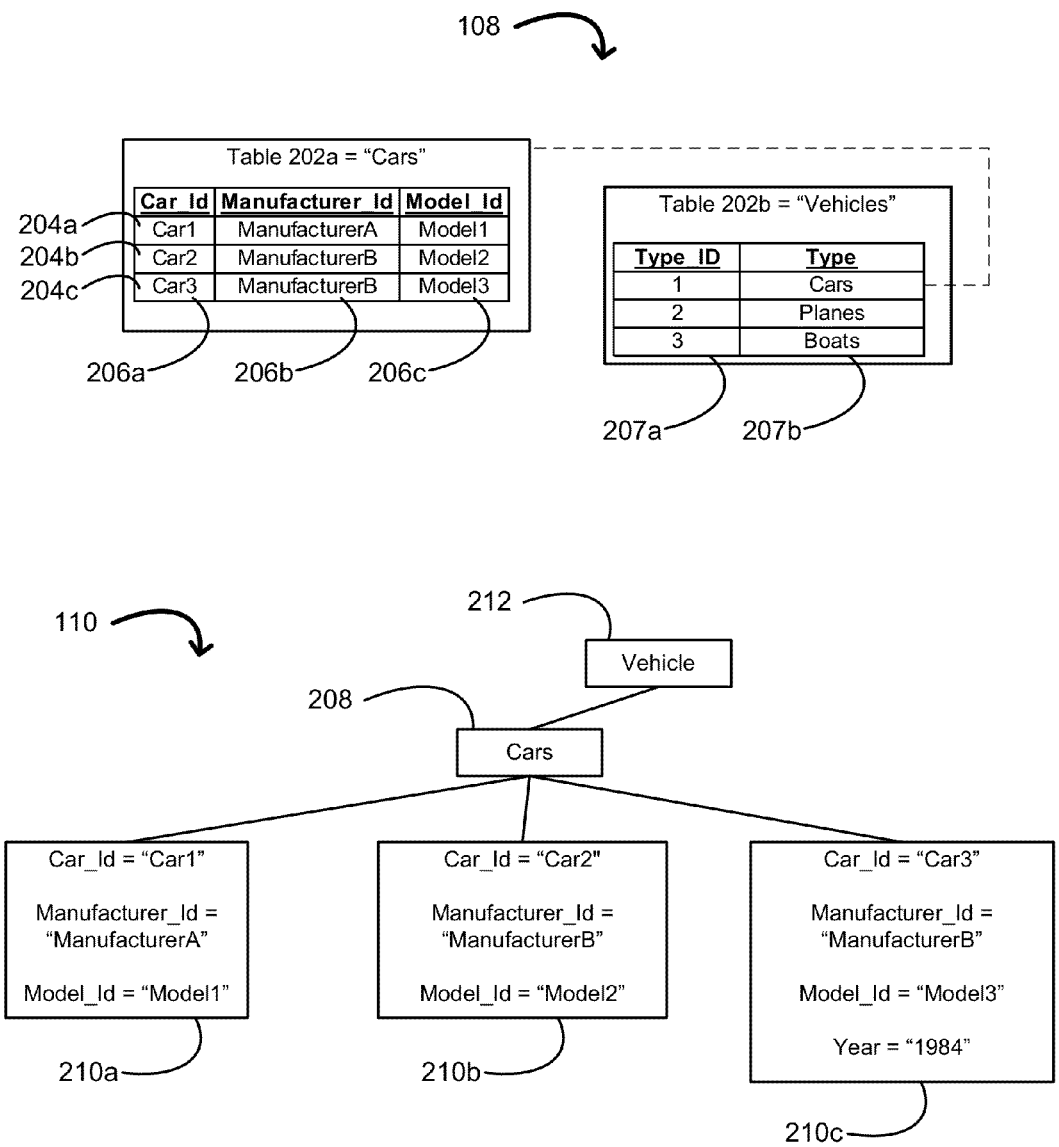
FIG. 2 is a is a modeling diagram illustrating an exemplary relational database and an exemplary hierarchical data structure.

FIG. 2 is a modeling diagram illustrating an exemplary relational database 108 and an exemplary hierarchical data structure 110.

The relational database 108 can include, for example, a relational database having one or more related tables, such as tables 202a-b. In the example depicted in FIG. 2, the table 202a can be labeled "Cars" and can store data records corresponding to car objects. Attributes associated with a car object can include an identifier for the car, a manufacturer for the car, and a model of the car. The attributes of an object can be mapped to the columns of the table 202a database using metadata identifying the relationship between an attribute of an object and the database in which the object is stored. For example, an object may include metadata specifying that the object is to be stored to the table named "Cars," that a unique identifier for object is to be stored to "Car_Id", and that other attributes of the object are to be respectively stored to "Manufacturer_Id" and "Model_Id."

Each of the rows 204a-c of the table can correspond to a car object. For each car object corresponding to a row of the table, an attribute of the car object can be associated with a column of the table 202a. Column 206a can be labeled "Car_Id" and can include data identifying a specific car. "Car_Id" can be a unique identifier for each row of the table. Column 206b can be labeled "Manufacturer_Id" and can include data identifying the manufacturer of the car. Column 206c can be labeled "Model_Id" and can include data identifying the model of the car. The row 204a can correspond to a car object having a value "Car1" for Car_Id, a value "ManufacturerA" for Manufacturer_Id, and a value "Model1" for Model_Id. The row 204b can correspond to a car object having a value "Car2" for Car_Id, a value "ManufacturerB" for Manufacturer_Id, and a value "Model2" for Model_Id. The row 204c can correspond to a car object having a value "Car3" for Car_Id, a value "ManufacturerB" for Manufacturer_Id, and a value "Model3" for Model_Id.

The table 202b can store data records corresponding to vehicle objects. The column 207a of the table 202b can include data identifying each row in the table 202b. The column 207b of the table 202b can include data identifying a vehicle type in a row of the table 202b, such as "Cars," "Planes," and "Boats." The table 202a can be related to the table 202b based on the value of the column 207b, as depicted by the dashed line connecting the record for "Cars" in the table 202b to the table 202a.

Accessing an object stored as one of the rows 204a-c of in the relational database 108 can include identifying the table 202a in which the object is stored and identifying that one or more of the columns 206a-c of the table 202a has a value corresponding to the object. For example, to access objects having a Manufacturer_Id of ManufacturerB, an application may provide a query to the relational database 108 identifying table 202a and selecting the rows from the table 202a where Manufacturer_Id=ManufacturerB.

A hierarchical data structure 110 can store car objects using hierarchical relationships. For example, a node 208 can be labeled "Cars." The node 208 can be associated with child nodes 210a-c. Each of the child nodes 210a-c can be associated with a car having the properties Car_Id, Manufacturer_Id, and Model_Id. The child node 210a can correspond to a car having a value "Car1" for Car_Id, a value "ManufacturerA" for Manufacturer_Id, and a value "Model1" for Model_Id. The child node 210b can correspond to a car having a value "Car2" for Car_Id, a value "ManufacturerB" for Manufacturer_Id, and a value "Model2" for Model_Id. The child node 210c can correspond to a car having a value "Car3" for Car_Id, a value "ManufacturerB" for Manufacturer_Id, and a value "Model3" for Model_Id.

The node 208 can be a child of node 212, labeled "Vehicles." Accessing an object in the hierarchical data structure 110 can include identifying a path to the node corresponding to the object. For example, to access objects having a Manufacturer_Id of ManufacturerB, an application would submit a query to the relational database 108 identifying the path from root node 212 to node 208 and selecting the child nodes of node 208 where Manufacturer_Id=ManufacturerB.

Different nodes in a hierarchical data structure 110 can have different properties. Some nodes may include only an identifier for the node and a relationship to other nodes. For example, each of nodes 208, 212 may include only their respective identifiers ("Cars" and "Vehicles") and their relationship to one another. Other nodes can include identifiers, relationships, and one or more additional properties. For example, each of nodes 210a-c include their respective identifiers ("Car1," "Car2," and "Car3"), their relationship to the node 208, and their respective values for Manufacturer_Id and Model_Id. As another example, although nodes 210a-c are child nodes of node 208, the properties for each node are not identical. The node 210c has an additional property of "Year" with a value "1984."

As depicted in FIG. 2, data records in the relational database 108 can include properties corresponding to data records in the hierarchical data structure 110. The table 202a, having multiple rows describing car objects, corresponds to the node 208, having multiple child nodes describing car objects. Each of the rows 204a-c respectively corresponds to one of the child nodes 210a-c. Each of the columns 206a-c respectively corresponds to a property of the child notes 210a-c.

Figure 3:
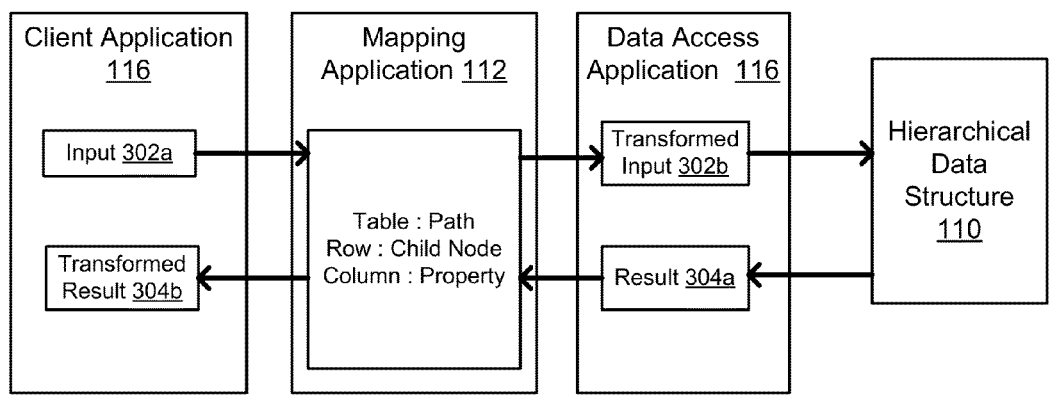
FIG. 3 is a modeling diagram illustrating an exemplary flow of communications between a client application and a hierarchical data structure.

A client application 116 may be configured to access or otherwise use objects via a function call formatted for a relational database 108. A mapping application 112 executed at the server system 102 can transform the function call such that the function call is formatted for a relational database 108. FIG. 3 is a modeling diagram illustrating an exemplary flow of communications between a client application 116 and a hierarchical data structure 110.

The client application 112 of client system 104 can provide a function call 302a from client application 116 to the server system 102. The function call 302a can be formatted for a relational database 108 and addressed to the hierarchical data structure 110.

A function call 302a can include a query for retrieving data from a data source storing data using a relational database 108. The query may identify a hierarchical data structure 110 as the data source and reference one or records using syntax for a relational database 108. For example, the function call 302a can be a command from a client application 112 incorporating a Java Persistence API ("JPA") package for managing relational databases and directed to a storage system using the Content Repository API for Java ("JCR"). Thus, a data access application 114 may be unable to properly retrieve the data using the command included in the function call 302a and therefore fail to properly execute the command.

For example, a query for retrieving car objects from hierarchical data structure 110 may formatted for interaction with a relational database 108. The query may thus include a reference identifying the table "Cars." The query would not identify the path to the node "Cars" (i.e. "Vehicles/Ground/Cars") used by the hierarchical data structure 110 to store car objects. Thus, the query to the hierarchical data structure 110 formatted for interaction with the relational database would fail to return the car objects stored in the hierarchical data structure 110.

A mapping application 112 can prevent such a failure. The mapping application 112 can receive the function call 302a from the client application 116. The mapping application 112 can transform the function call 302a into transformed function call 302b using the relationships between records of the relational database 108 and the hierarchical data structure 110.

For example, the mapping application 112 can transform a reference to a table in the function call 302a to a reference identifying a path to a node corresponding to the table in the transformed function call 302b. For example, a function call identifying the table "Cars" can be transformed to a function call identifying the path "/Vehicles/Cars." The mapping application 112 can transform a function referencing a column in the function call 302a to a corresponding function referencing a property of a node in the transformed function call 302b. The mapping application 112 can transform a function referencing a row in the function call 302a to a corresponding function referencing a child node in the transformed function call 302b.

The mapping application 112 can transform relationships between tables identified in a function call to relationships between nodes. For example, the mapping application 112 can determine that a function call 302a includes a reference to the relationship between the table "Cars" and the table "Vehicles." The mapping application 112 can determine that relationship from "Vehicles" to "Cars" is a "many to one" relationship. The mapping application 112 can thus determine the hierarchical relationship between "Vehicles" and "Cars" is parent-child, as depicted by nodes 212 in FIG. 2.

The mapping application 112 can provide the transformed function call 302b to the data access application 114. The data access application 114 can access or otherwise use data of the hierarchical data structure 110 in a manner specified by the transformed function call 302b.

The mapping application 112 can transform an output from the data access application 114 such that the output can be used by a function for a relational database. The data access application 114 can obtain a result 304a by accessing or otherwise using data of a hierarchical data structure 110 in a manner specified by the transformed function call 302b. The data access application 114 can provide the result 304a to the mapping application 112. The mapping application 112 can transform the result 304a into the transformed result 304b for use by the client application 116.

The mapping application 112 can transform a reference to a node in the result 304a to a corresponding reference to a table in the transformed result 304b. The mapping application 112 can transform a reference to a child node in the result 304a to a corresponding reference to a row in the transformed result 304b. The mapping application 112 can transform a reference to a property of a node in the result 304a to a corresponding reference to a column in the transformed result 304b.

For example, a query from the client application 116 to the hierarchical data structure 110 for car objects having a value "Manufacturer A" for the attribute "Manufacturer_ID" may return the result "Vehicles/Cars/Car1." The client application 116 may reference car objects by reference to the table "Cars." The mapping application 112 can transform the result "Vehicles/Cars/Car1" to a result "Cars.Car1" for use by the client application 116.

Figure 4:
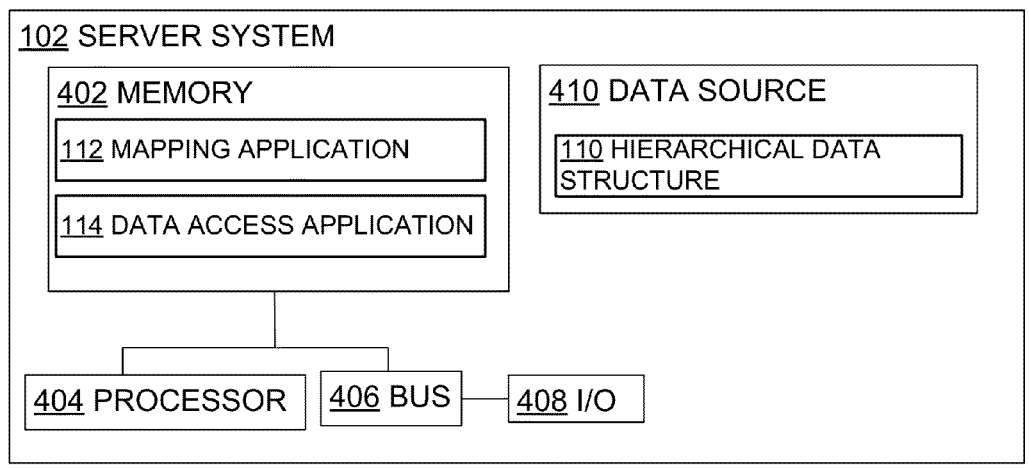
FIG. 4 is a block diagram depicting exemplary computing devices in an exemplary computing environment for implementing certain embodiments.

FIG. 4 is a block diagram depicting exemplary computing devices in an exemplary computing environment for implementing certain embodiments. Mapping application 112 executes or is otherwise used on the exemplary server system 102 and is shown using functional components or modules. As is known to one of skill in the art, such electronic content may be resident in any suitable non-transitory computer-readable medium and can be executed on any suitable processor.

For example, as shown, an exemplary server system 102 can include a non-transitory computer-readable medium, such as a random access memory (RAM) 402, coupled to a processor 404 that executes computer-executable program instructions and/or accesses information stored in a memory 402. Such a processor 404 may include a microprocessor, an application-specific integrated circuit (ASIC), a state machine, or other processor, and can be any of a number of computer processors. Such a processor can include, or may be in communication with, a non-transitory computer-readable medium which stores instructions that, when executed by the processor 404, cause the processor 404 to perform the steps described herein.

A non-transitory computer-readable medium may include, but is not limited to, an electronic, optical, magnetic, or other storage device capable of providing a processor with computer-readable instructions. Other examples include, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may comprise processor-specific instructions generated by a compiler and/or an interpreter from code written in any suitable computer-programming language, including, for example, C, C++, C#, Visual Basic, Java, Python, Perl, JavaScript, and ActionScript.

The server system 102 can receive input and provide output via input/output (I/O) interface 408. I/O interface 408 can include, for example, a network interface for communication via the network 106. A bus, such as bus 406, is included in the server system 102. Server system 102 can be any type of computing system included in a network at a domain appropriate for providing one or more of the features described herein.

FIG. 4 illustrates an exemplary server system 102 that includes, in a memory 402, a mapping application 112 and a data access application 114. The mapping application 112 can configure the processor 404 to receive function call via the I/O interface 408. The mapping application 112 can configure the processor 404 to transform the function call received via the I/O interface 408 and provide the transformed function call to the data access application 114. The data access application 114 can configure the processor 404 to retrieve data from a data source 410 having a hierarchical data structure 110. A data source 410 can be any source of data that provides data upon request, pushed data, or otherwise provides data items for use by other applications. In alternative embodiments, the data source 410 may be disposed in the server system 102 or be provided from a separate server system or other external location. The data access application 114 can configure the processor 404 to load the data from the data source 410 into the memory 402 and apply the transformed function call to the data to obtain a result. The mapping application 112 can configure the processor 404 to transform the result and output the transformed result via the I/O interface 408.

Figure 5:
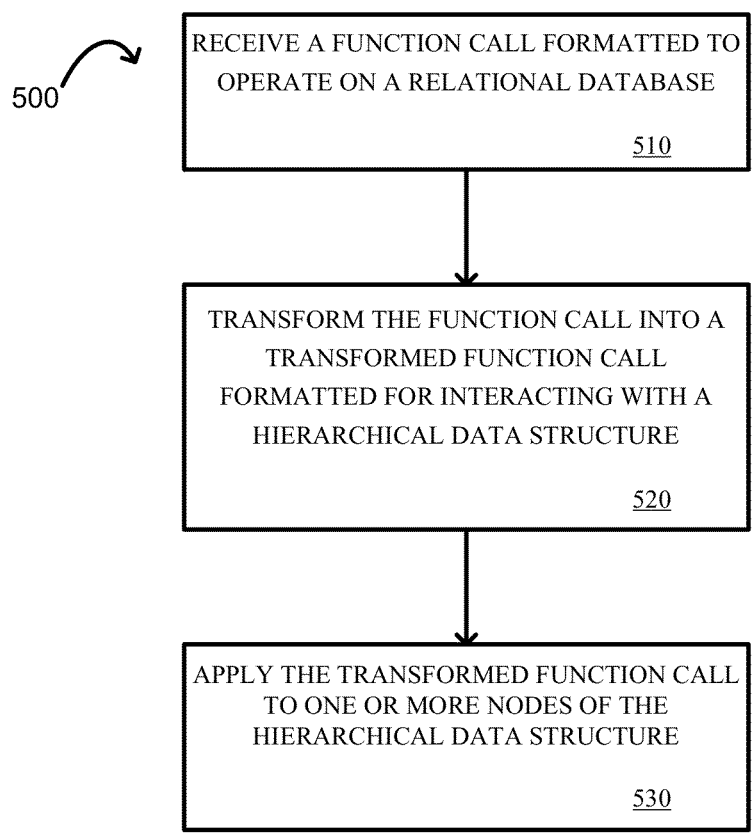
FIG. 5 is a flow chart illustrating an exemplary method for transforming function calls formatted for interaction with a relational database.

FIG. 5 is a flow chart illustrating an exemplary method 500 for transforming function calls formatted for interaction with a relational database. For illustrative purposes, the method 500 is described with reference to the flow of communications depicted in FIG. 3 and the system implementation depicted in FIG. 4. Other implementations, however, are possible.

The exemplary method 500 involves receiving a function call formatted to operate on a relational database, as shown in block 510. The mapping application 112 can receive the function call. The function call 302a can reference an object in the relational database 108 by referencing at least one table 202a of the relational database 108 and at least one column of the table.

The exemplary method 500 further involves transforming the function call 302a into a transformed function call formatted for interacting with a hierarchical data structure 110, as shown in block 520. The mapping application 112 can transform the function call 302a into the transformed function call 302b.

In an exemplary embodiment, the mapping application 112 can transform the function call 302a by mapping a reference included in the function call from a table to a path. For example, the path can identify a relationship between a node 208 corresponding to the table 202 and a parent node 212 of the node 208 corresponding to the table, as described above with respect to FIG. 3.

In additional or alternative embodiments, the mapping application 112 can map a reference included in the function call 302a from a row of the table 202a of the relational database 108 to a child node of the node corresponding to the table. The mapping application 112 can also map a reference included in the function call 302a from a column of the table 202a of the relational database 108 to a property of the child node.

In additional or alternative embodiments, the mapping application 112 can transform the function call 302a by mapping a reference in the function call 302a to a relationship between tables 202a-b of the relational database 108 to a relationship between a parent node and a child node, such as the parent-child relationship of node 208 with nodes 210a-c.

The exemplary method 500 further involves applying the transformed function call to one or more nodes of the hierarchical data structure, as shown in block 530. For example, a transformed function call that is a query to retrieve one or more objects can be applied to one or more nodes of the hierarchical data structure by retrieving the one or more nodes corresponding to the objects. A transformed function call that is a command to modify one or more objects can be applied to one or more nodes of the hierarchical data structure by modifying the one or more nodes corresponding to the objects. A transformed function call that is a command to delete one or more objects can be applied to one or more nodes of the hierarchical data structure by delete the one or more nodes corresponding to the objects.

Exemplary Implementation Using Java

In an exemplary embodiment, the mapping application 112 can transform a function calls from a client application 116 using a Java Persistence API package ("JPA") for managing relational databases into a transformed function call using the Content Repository API for Java ("JCR").

JCR can include or use multiple query languages, such as (but not limited to) JCR-SQL and XPATH. JCR-SQL can share features other SQL-based query languages in using keywords such as SELECT, FROM, WHERE, etc. JCR-SQL can be used with a node-based or other hierarchical storage model. For example, JCR-SQL provides functions such as PATH and NAME to retrieve node-specific information that may not be used in a relational database storage model. Such function can allow for querying hierarchical data structures or other node-based storage systems. XPATH can be used with a hierarchical data structure to, for example, extract Extensible Markup Language ("XML") nodes from a document.

In one example, a JPA function call may be a query to retrieve instances of an object, such as "SELECT e FROM Employee e WHERE e.salary>:baseSalary." To transform the JPA function call into a JCR-SQL or XPATH function call, the mapping application 112 can transform references to a table "Employee" into corresponding references to a node "Employee." Examples of a transformed function call can include a JCR-SQL function call "SELECT * FROM [nt: unstructured] as node WHERE node.salary>:baseSalary AND PATH(node) LIKE '/tables/employees/%'" or an XPATH function call "/jcr:root/tables/employees//element(*, nt: unstructured) [@salary>:baseSalary]."

In another example, a JPA function call may be a command to update instances of an object, such as "UPDATE Employee e SET e.salary=e.salary * 1.2 WHERE e.employeeId=1234." The mapping application 112 can transform the JPA function call so as to accommodate for the absence of an UPDATE function call in JCR. The mapping application 112 can transform the UPDATE statement to select a node object using a SELECT function call matching the criteria of the provided SQL UPDATE statement. Such a SELECT function call can be a JCR-SQL function call "SELECT * FROM [nt:unstructured] as node WHERE node.id=1234 PATH(node) LIKE '/tables/employees/%'" or an XPATH function call "/root/employees//element(*, nt:unstructured)[@id=1234]." The mapping application 112 can use a function call for modifying one or more attributes of the selected node, such as the function call "node.setProperty("salary", node.getProperty("salary").getDouble( )* 1.2)."

In another example, a JPA function call may be a command to delete instances of an object, such as "DELETE FROM Manager m WHERE e.employees IS EMPTY." The mapping application 112 can transform the JPA function call so as to accommodate for the absence of a DELETE function call in JCR. The mapping application 112 can transform the DELETE statement to select a node object using a SELECT function call matching the criteria of the provided SQL DELETE statement. The SELECT function call can retrieve one or more node objects matching specified criteria. Such a SELECT function call can be a JCR-SQL function call "SELECT * FROM [nt:unstructured] as node WHERE node.employees IS NULL and PATH(node) LIKE '/tables/managers/%'" or an XPATH function call "/root/managers//element(*, nt:unstructured)[not(@employees)]." The mapping application 112 can use a function call for deleting a node, such as "node.remove( )".

General

Numerous specific details are set forth herein to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other storage devices, transmission devices, or display devices of the computing platform.

The system or systems discussed herein are not limited to any particular hardware architecture or configuration. A computing device can include any suitable arrangement of components that provide a result conditioned on one or more function calls. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

The invention claimed is:

1. A method comprising:
receiving, by a processor, a function call formatted to operate on a relational database;
transforming, by the processor, the function call into a transformed function call formatted for interacting with a hierarchical data structure, wherein the hierarchical data structure comprises a plurality of nodes, wherein transforming the function call comprises:
determining that the function call lacks at least one feature required for interacting with the hierarchical data structure, and
modifying the function call to include the at least one feature; and
applying, by the processor, the transformed function call to at least one node of the hierarchical data structure.

2. The method of claim 1, wherein the function call references an object in the relational database by referencing at least one table of the relational database and at least one column of the at least one table.

3. The method of claim 1, wherein determining that the function call lacks the at least one feature comprises determining that the function call includes at least one reference to at least one table corresponding to at least one node of the plurality of nodes and that the function call lacks a reference to a respective parent node of the at least one node;
wherein modifying the function call to include the at least one feature comprises:
identifying a path for the at least one node, wherein the path comprises the at least one node and the respective parent node, and
transforming the at least one reference to at least one transformed reference, wherein the path including the at least one node and the respective parent node is referenced in the at least one transformed reference.

4. The method of claim 3, wherein transforming the function call further comprises:
mapping at least one row of the at least one table to a child node of the node corresponding to the table, wherein the at least one row is referenced in the function call; and
mapping at least one column of the at least one table to a property of the child node, wherein the at least one column is referenced in the function call.

5. The method of claim 1,
wherein determining that the function call lacks the at least one feature comprises determining that the function call lacks a reference to a relationship between a first node of the plurality of nodes and a second node of the plurality of nodes, wherein the first node corresponds to a first table of the relational database and the second node corresponds to a second table of the relational database, wherein the relationship between the first table and the second table is referenced in the function call;
wherein modifying the function call to include the at least one feature comprises mapping the relationship between the first table and the second table to the relationship between the first node and the second node.

6. The method of claim 1, wherein the function call comprises a command to perform at least one of storing the object, modifying the object, or deleting the object.

7. The method of claim 1, further comprising:
generating, by the processor, a result based on applying the transformed function call to the at least one node of the hierarchical data structure; and
transforming, by the processor, the result such that the result is formatted for interacting with the relational database.

8. The method of claim 1, wherein the function call comprises a Java Persistence Application Programming Interface command and wherein the transformed function call comprises a Java Content Repository Application Programming Interface command.

9. The method of claim 1,
wherein determining that the function call lacks at least one feature required for interacting with the hierarchical data structure comprises determining that a programming language for interacting with the hierarchical data structure does not include the function call; and
wherein modifying the function call to include the at least one feature comprises identifying at least one additional function call from the programming language for interacting with the hierarchical data structure, wherein the least one additional function call modifies data in the hierarchical data structure in a similar manner as the function call modifies data in the relational database.

10. A system comprising:
a processor configured to execute instructions stored in a non-transitory computer-readable medium;
wherein the instructions are configured to perform operations comprising:
receiving a function call formatted to operate on a relational database;
transforming the function call into a transformed function call formatted for interacting with a hierarchical data structure, wherein the hierarchical data structure comprises a plurality of nodes, wherein transforming the function call comprises:
determining that the function call lacks at least one feature required for interacting with the hierarchical data structure, and
modifying the function call to include the at least one feature; and
applying the transformed function call to at least one node of the hierarchical data structure.

11. The system of claim 10, wherein the function call references an object in the relational database by referencing at least one table of the relational database and at least one column of the at least one table.

12. The system of claim 10,
wherein determining that the function call lacks the at least one feature comprises determining that the function call includes at least one reference to at least one table corresponding to at least one node of the plurality of nodes and that the function call lacks a reference to a respective parent node of the at least one node;
wherein modifying the function call to include the at least one feature comprises:
identifying a path for the at least one node, wherein the path comprises the at least one node and the respective parent node, and
transforming the at least one reference to at least one transformed reference, wherein the path including the at least one node and the respective parent node is referenced in the at least one transformed reference.

13. The system of claim 12,
wherein determining that the function call lacks the at least one feature comprises determining that the function call lacks a reference to a relationship between a first node of the plurality of nodes and a second node of the plurality of nodes, wherein the first node corresponds to a first table of the relational database and the second node corresponds to a second table of the relational database, wherein the relationship between the first table and the second table is referenced in the function call;

wherein modifying the function call to include the at least one feature comprises mapping the relationship between the first table and the second table to the relationship between the first node and the second node.

14. The system of claim 12, wherein the instructions are configured to transform the function call by performing additional operations comprising:

mapping at least one row of the at least one table to a child node of the node corresponding to the table, wherein the at least one row is referenced in the function call; and mapping at least one column of the at least one table to a property of the child node, wherein the at least one column is referenced in the function call.

15. The system of claim 10, wherein the instructions are configured to perform additional operations comprising:

generating a result based on applying the transformed function call to the at least one node of the hierarchical data structure; and transforming the result such that the result is formatted for interacting with the relational database.

16. A non-transitory computer-readable medium embodying program code executable by a computer system, the non-transitory computer-readable medium:

program code for receiving a function call formatted to operate on a relational database;

program code for transforming the function call into a transformed function call formatted for interacting with a hierarchical data structure, wherein the hierarchical data structure comprises a plurality of nodes, wherein transforming the function call comprises:

determining that the function call lacks at least one feature required for interacting with the hierarchical data structure, and modifying the function call to include the at least one feature; and program code for applying the transformed function call to at least one node of the hierarchical data structure.

17. The non-transitory computer-readable medium of claim 16, wherein the function call references an object in the relational database by referencing at least one table of the relational database and at least one column of the at least one table.

18. The non-transitory computer-readable medium of claim 16, wherein determining that the function call lacks the at least one feature comprises determining that the function call includes at least one reference to at least one table corresponding to at least one node of the plurality of nodes and that the function call lacks a reference to a respective parent node of the at least one node;

wherein modifying the function call to include the at least one feature comprises:

identifying a path for the at one least node, wherein the path comprises the at least one node and the respective parent node, and transforming the at least one reference to at least one transformed reference, wherein the path including the at least one node and the respective parent node is referenced in the at least one transformed reference.

19. The non-transitory computer-readable medium of claim 18, wherein the program code for transforming the function call further comprises:

program code for mapping at least one row of the at least one table to a child node of the node corresponding to the table, wherein the at least one row is referenced in the function call; and program code for mapping at least one column of the at least one table to a property of the child node, wherein the at least one column is referenced in the function call.

20. The non-transitory computer-readable medium of claim 16, further comprising:

program code for generating a result based on applying the transformed function call to the at least one node of the hierarchical data structure; and program code for transforming the result such that the result is formatted for interacting with the relational database.

\* \* \* \* \*